(12) United States Patent
Nikovski et al.

(10) Patent No.: US 7,743,890 B2
(45) Date of Patent: Jun. 29, 2010

(54) METHOD AND SYSTEM FOR DETERMINING INSTANTANEOUS PEAK POWER CONSUMPTION IN ELEVATOR BANKS

(75) Inventors: Daniel N. Nikovski, Cambridge, MA (US); Matthew E. Brand, Newtonville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 456 days.

(21) Appl. No.: 11/761,683

(22) Filed: Jun. 12, 2007

(65) Prior Publication Data

US 2008/0308361 A1 Dec. 18, 2008

(51) Int. Cl.
*B66B 1/18* (2006.01)
(52) U.S. Cl. .................. 187/382; 187/247; 187/388
(58) Field of Classification Search ............. 187/247, 187/280–287, 380–388
See application file for complete search history.

(56) References Cited

U.S. PATENT DOCUMENTS

| | | | | |
|---|---|---|---|---|
| 4,349,087 A | * | 9/1982 | Bittar et al. | 187/382 |
| 4,402,387 A | * | 9/1983 | Tsuji et al. | 187/293 |
| 4,448,286 A | * | 5/1984 | Kuzunuki et al. | 187/387 |
| 5,663,539 A | * | 9/1997 | Powell et al. | 187/385 |
| 6,293,368 B1 | * | 9/2001 | Ylinen et al. | 187/382 |
| 6,474,447 B2 | * | 11/2002 | Tajima et al. | 187/290 |
| 6,672,431 B2 | | 1/2004 | Brand | |
| 6,889,799 B2 | * | 5/2005 | Tyni et al. | 187/282 |
| 6,913,117 B2 | * | 7/2005 | Tyni et al. | 187/382 |
| 7,032,715 B2 | * | 4/2006 | Smith et al. | 187/380 |
| 7,275,623 B2 | * | 10/2007 | Tyni et al. | 187/382 |
| 7,416,057 B2 | * | 8/2008 | Kostka | 187/382 |
| 7,546,906 B2 | * | 6/2009 | Tyni et al. | 187/382 |
| 7,559,407 B2 | * | 7/2009 | Siikonen et al. | 187/382 |

FOREIGN PATENT DOCUMENTS

| | | |
|---|---|---|
| WO | 2004113216 A | 12/2004 |
| WO | WO 2006/095048 | 9/2006 |
| WO | 2006120283 A | 11/2006 |

* cited by examiner

*Primary Examiner*—Jonathan Salata
(74) *Attorney, Agent, or Firm*—Dirk Brinkman; Gene Vinokur

(57) ABSTRACT

A method and system determine peak power consumption over time by a bank of elevator for servicing a set of passenger hall calls and delivery requests, and selecting elevator schedules that keep peak power consumption below a predetermined threshold. For each car in response to receiving a hall call, a set of all possible paths to service all hall calls assigned to the car are determined, in which each path includes a set of all possible segments. A peak power consumption for each possible segment is also determined. The peak power consumptions for the set of all possible segments for each time instant are added to determine a total peak power consumption for each time instant, and a particular path is selected as a schedule to operate the bank of elevator cars, if the total peak power consumption for any instant in time while operating according to the selected schedule is below a predetermined threshold.

19 Claims, 6 Drawing Sheets

METHOD AND SYSTEM FOR DETERMINING INSTANTANEOUS PEAK POWER CONSUMPTION IN ELEVATOR BANKS

FIELD OF THE INVENTION

The invention relates generally to power consumption in a bank of elevator cars, and more particularly to determining the instantaneous peak power consumption of the bank of elevator cars.

BACKGROUND OF THE INVENTION

A primary objective of a controller of an elevator bank is to optimize various performance measures according to constraints, such as minimize waiting time and travel time and maximize smoothness of travel, while at the same time balancing various cost measures related to operational expenses, such as minimizing total energy consumption, reducing equipment wear, and the like.

Most traction sheave elevators have counterweights. The counterweights ride on rails within the elevator shaft. The counterweights reduce significantly the peak power consumed. For an ideally balanced counterweight, the weight is equal to that of the car and the average number of passengers in the car, e.g., 40% capacity. Electric power is used only to accelerate and decelerate the car and to counteract friction.

Without a counterweight, the power consumed to move the car and the passengers increases significantly. However, when moving downwards, the weight of the car and passengers can be used to produce energy by means of regenerative braking. Therefore, the total energy consumption for elevators with and without counterweights is not necessarily very different. It is only the peak power consumption that differs significantly in the two cases.

Therefore, minimizing peak power consumption is of particular significance for traction sheave elevators without counterweights. Because energy and power are often confused, herein energy and power are distinguished and defined as follows: peak power is measured in watts (W); and energy consumption is measured in joules (J). That is, power is measured instantaneously, while energy is equal to power integrated over time.

U.S. Pat. No. 7,032,715, "Methods and apparatus for assigning elevator hall calls to minimize energy use," issued to Smith et al. on Apr. 25, 2006 describes a method for minimizing total energy. This has no relationship to minimizing peak power at any instant in time. The invention solves this problem.

Higher peak power consumption usually results in larger and more expensive electrical equipment, such as thicker cables and larger transformers. On the other hand, eliminating the counterweights frees up useful space on every floor of the building, resulting in major savings for the owners of that building. Consequently, it is desirable to find a way to control the operation of a bank of elevators without counterweights so that the peak power consumption remains below a predetermined threshold value at all times.

Most elevator controllers operate by considering a large number of candidate schedules, i.e. assignments of hall calls to elevator cars. The controller selects the schedule that is optimal with respect to a set of constraints. Peak power control depends critically on the ability of the controller to determine quickly the peak power that would be consumed while operating according to a particular schedule. The schedule for an individual car includes a list of passengers assigned to this car, and the overall schedule for the bank of elevators includes all individual car schedules.

Because energy consumption is additive, it is sufficient to determine the energy consumption for each car as a function of time, and sum up the values for each time instant for all cars. There are several possible ways to compute the individual energy consumption of each car over time for a specific schedule. The simplest way assumes that the energy consumption is a constant that depends only on the direction of motion of the car.

Clearly, the value of this constant is much higher for upward motion than for downward motion. When regenerative braking is used to produce energy, in fact, the constant for downward motion can even be negative. In such case, determining the iota energy consumption is very simple, and reduces to counting of how many cars move in the upward direction and how many cars are moving in the downward direction. If too many cars are moving in the upward direction, in comparison to a suitably selected threshold, then the schedule can be rejected and excluded from consideration. That method is described in International Patent Publication WO 2006/095048 applied for by Kone Corporation, and U.S. Patent Application 20060243536, "Method and device for controlling an elevator group, published Nov. 2, 2006.

However, in practical applications, the energy consumption of an elevator car is not constant over time, because its speed and acceleration vary during interfloor flight according to optimal control constraints, so that the flight is completed in minimal time while providing comfortable travel for the passengers in the car.

Another Kone method described in the same application WO 2006/095048 estimates the energy consumption based on a simulation of the car flight to its destination floor. That method is feasible only if the path taken by the car during the execution of its schedule is completely known. This is possible if, for example, the passengers can indicate their destination when calling a car, instead after entering the car as is done normally. In such a case, there would be no uncertainty, the car path is completely known, and can be simulated by a simulator in real time.

However, most hall calls are indicated by the usual pair of up/down buttons. Thus, the exact destination floor is usually not known. The exception being hall calls generated at the penultimate floor in either direction. Otherwise, the destination can be any floor in the requested direction of service. Depending on the exact destination of each passenger, the car can take a large number of possible paths, and simulating all paths is not feasible. More specifically, the number of such paths is exponential in the size of the building and the number of waiting passengers. If a building has N floors and M calls are assigned to the car, then $O(N^M)$ possible paths need to be considered to compute the peak power consumption for all cars for any schedule.

This difficult problem is solved by the invention.

SUMMARY OF THE INVENTION

A method and system determines, for any instant in time, total peak power consumption for a bank of elevator cars.

For each car in response to receiving a hall call, a set of all possible paths to service all hall calls assigned to the car are determined, in which each path includes a set of all possible segments.

A peak power consumption for each possible segment is also determined.

The peak power consumptions for the set of all possible segments for each time instant are added to determine a total peak power consumption for each time instant, and a particular path is selected as a schedule to operate the bank of elevator cars, if the total peak power consumption for any instant in time while operating according to the selected schedule is below a predetermined threshold.

DETAILED DESCRIPTION OF THE PREFERRED EMBODIMENT

Figure 6:
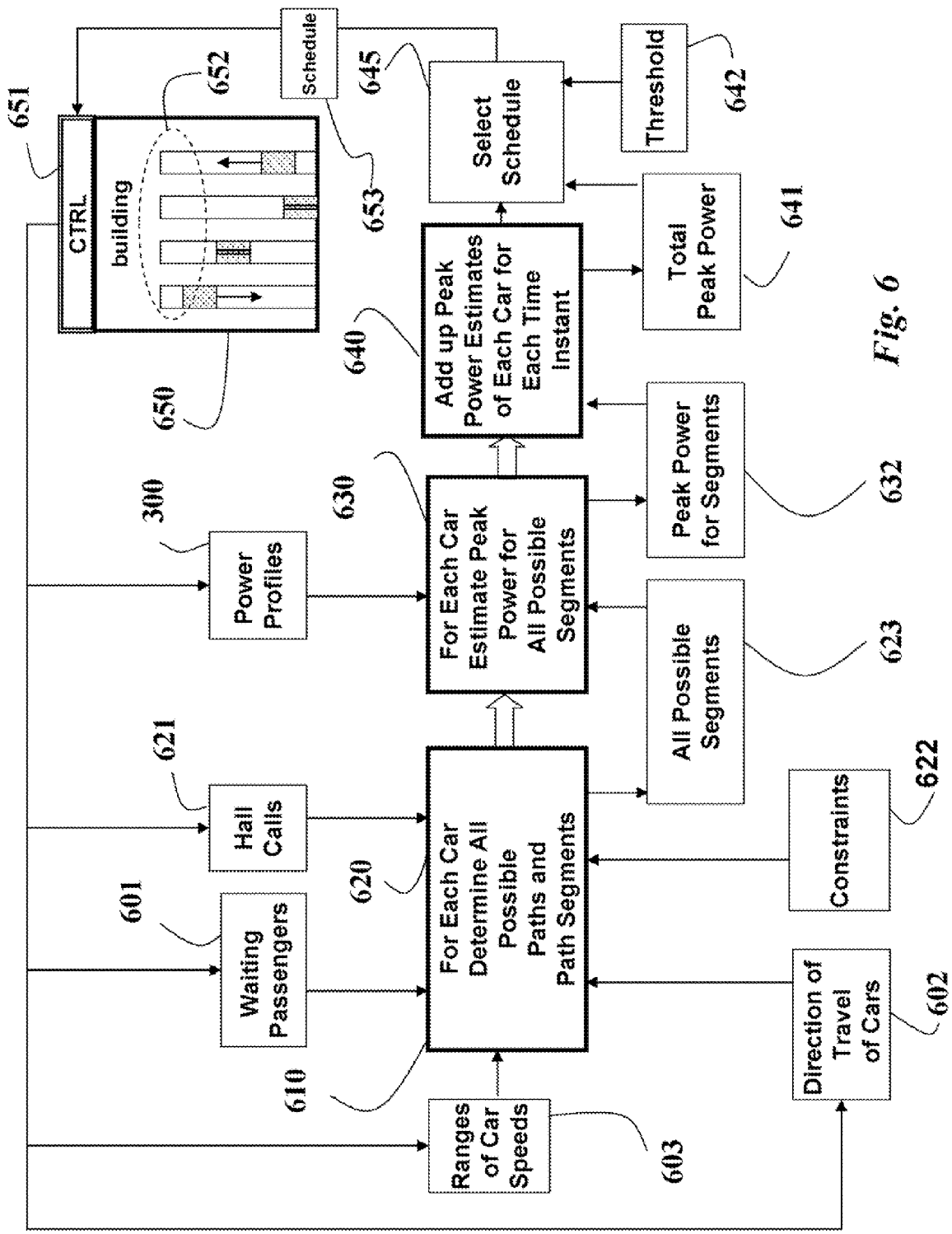
FIG. 6 is a flow diagram of a method for determining total peak power according to an embodiment of the invention.

As shown in FIG. 6, the embodiments of our invention provide a method and system for determining total peak power consumption, at any instant in time, for a bank of elevator cars 652 with or without counterweights for a set of hall calls 621 with unknown destination floors in a building.

Our elevator controller 651 considers a large number of candidate schedules and selects a schedule 653 that is optimal with respect to the total peak power that is consumed while operating the elevator cars according to the selected schedule 653. The schedule for a particular car includes the passengers assigned to the car, and the complete schedule for the bank of elevators includes all individual car schedules.

Formally, given the set of hall calls 621 that are assigned to a given car, the goal is to find the total peak power consumption that is required at any time while servicing these calls according to a particular schedule. The power consumption is described by a function F(t), where the time t ranges from 0 to the maximal possible time that servicing the set of calls can take. As described above, due to the uncertainty in the destination floors for the passengers, the car can take exponentially, i.e., $O(N^M)$ many paths when servicing the hall calls assigned to the car.

It is possible to determine power consumed during the traversal of a particular segment of a particular possible path. If the power consumed when following a particular possible path p is $f_p(t)$, then $F(t)=\max_{p \in P} f_p(t)$, where P is the exponentially large set of all possible paths. Each individual power profile $f_p(t)$ for a specific path p and number of passengers in the car can be determined from the operating data for the elevator car. However, finding the peak power over all such individual profiles is computationally difficult.

Figure 5:
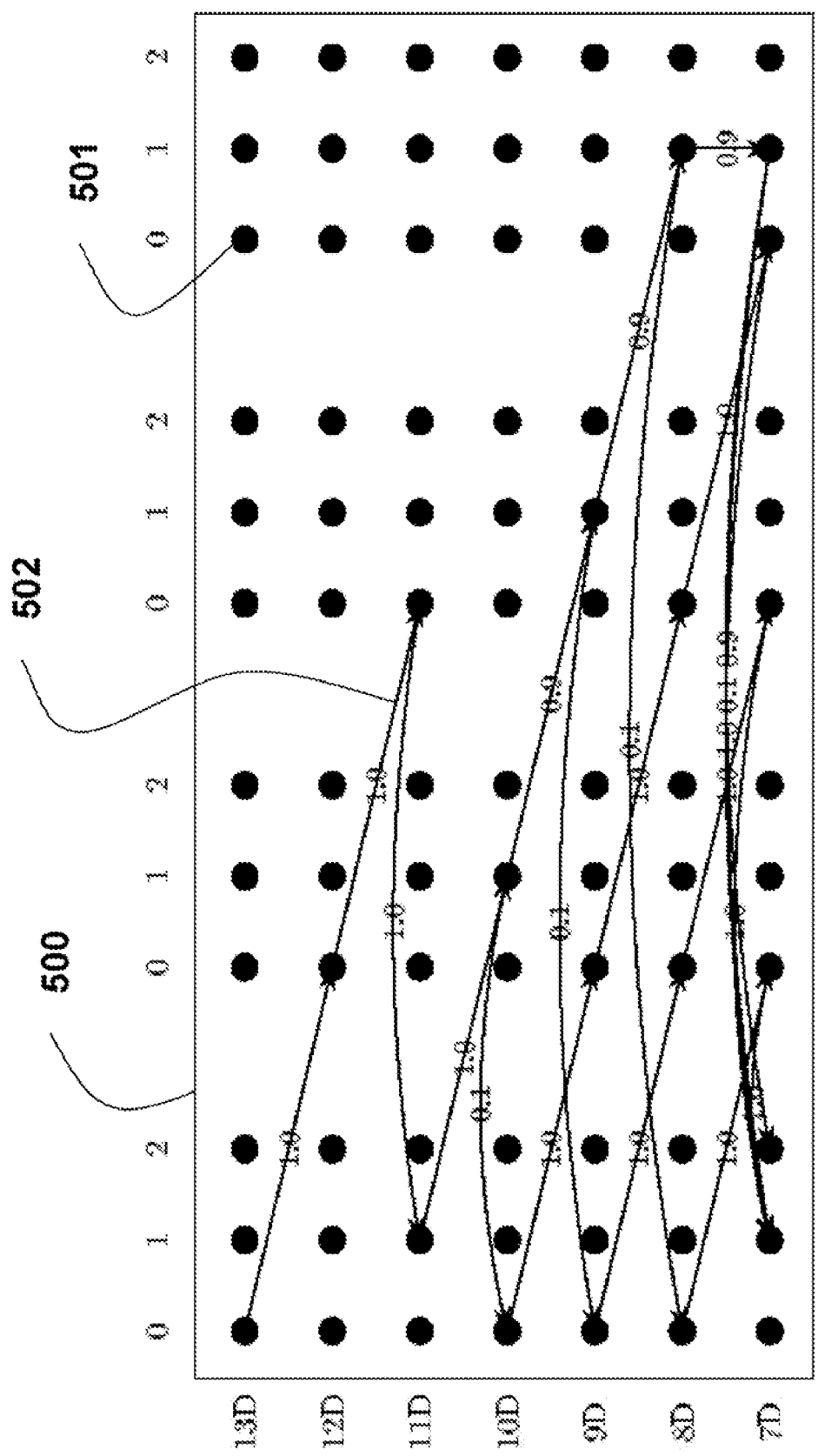
FIG. 5 is a dynamic programming trellis according to an embodiment of the invention.

Our solution uses a dynamic programming (DP) trellis, see FIG. 5. U.S. Pat. No. 6,672,433 issued to Brand and Nikovski, incorporated herein by reference, describes a trellis for estimating expected waiting times for passengers. There, all possible paths are partitioned into segments, and the travel times along these segments are combined probabilistically. The object of that method is to minimize waiting time and travel time for passengers. Instead, we are now interested to determine instantaneous peak power consumption.

The total number of all such possible segments is relatively small, e.g., linear in the number of floors N, and quadratic in the number of hall calls M. Like any moving mechanical system, a car traveling in an elevator shaft can be modeled with a phase-space diagram, as shown in FIG. 1.

Figure 1:
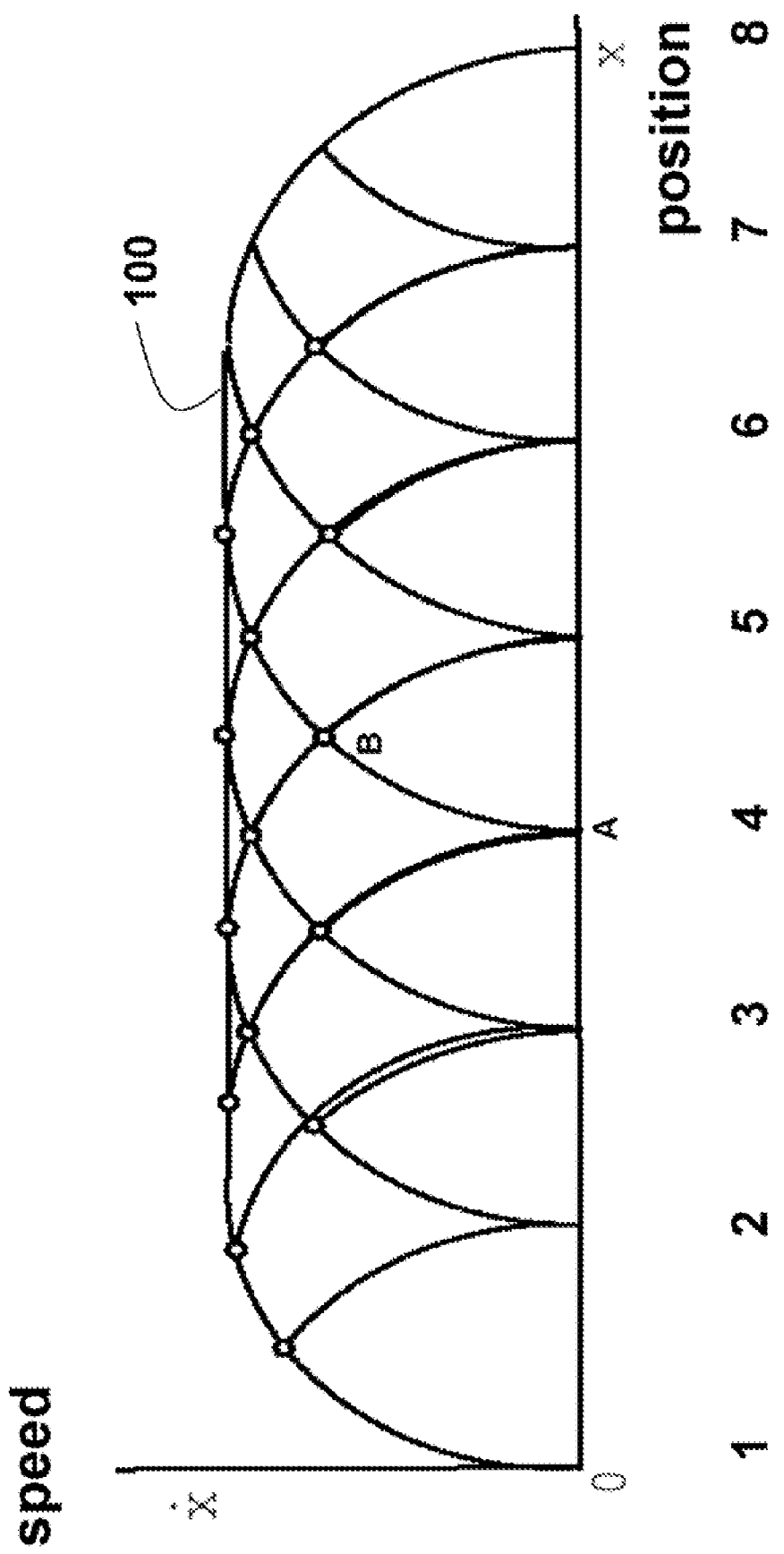
FIG. 1 is a phase-space diagram of all possible paths of an elevator car moving upwards in an elevator shaft according to an embodiment of the invention.

FIG. 1 shows the phase-space diagram 100 of a single car moving upwards in an elevator shaft of a building with eight floors, not all of which have equal height. In FIG. 1, the vertical axis indicates speed and the horizontal axis position in the shaft (floors).

FIG. 1 shows the possible coordinates (x, ẋ) of possible paths, for the position x of the car along the shaft and its speed ẋ. When the car is moving under constant acceleration without friction, its path includes segments which are parts of parabolas. These paths branch only on a small number of points, denoted by circles in FIG. 1. These points always correspond to the last possible position at which a car can still stop at one of the floors in its direction of motion. A particular path of a car includes a finite number of segments. The endpoints are branching or resting points (floors). Consequently, if the expected performance measure on each such segment can be determined, then that value can be reused for the determination along any paths which include that segment.

The power consumed during the traversal of a particular segment can be determined exactly. This power profile depends on the total mass of the car including passengers, as well as on the direction of motion, and whether the car is accelerating, decelerating, or running at constant speed at a particular moment in time. However, the shape of this profile does not depend on exactly when a traversal of the segment takes place. Various realizations of this traversal at different times have the same power consumption profile, suitably displaced in time.

Using the fact that paths are composed of segments, and a single segment can be traversed at different times, the peak power consumption or power profile F(t) at a particular instant in time t can be expressed as a nested maximization: $F(t)=\max_{s \in S}\max_{\tau \in \gamma_s} f_s(t, \tau)$ where S is a set of possible segments of the phase-space diagram, and $\gamma_s$ is a set of all possible starting times τ for realizations of a particular segment s.

The power profile $f_s(t, \tau)$ of the realization of a particular segment s depends on the starting time τ of the realization, and the profile of the total peak power consumption is time-invariant: $f_s(t, \tau)=f_s(t+\Delta t, \tau+\Delta \tau)$, for any time interval Δt.

The number of all possible segments in a phase-space diagram is relatively small. In general, the size of S is linear in the number of floors N, quadratic in the number of passengers M to be assigned to the car, and a small constant multiple depending on a maximal speed of the car.

Hence, implementing the first maximization, over all segments in s is possible. However, the size of the set $\gamma_s$ of all possible starting times for the realization of segment s is exponential in the number of floors the elevator car must traverse before initiating the segment, and also exponential in the number of passengers that have to be picked up before the beginning of this segment.

Figure 2:
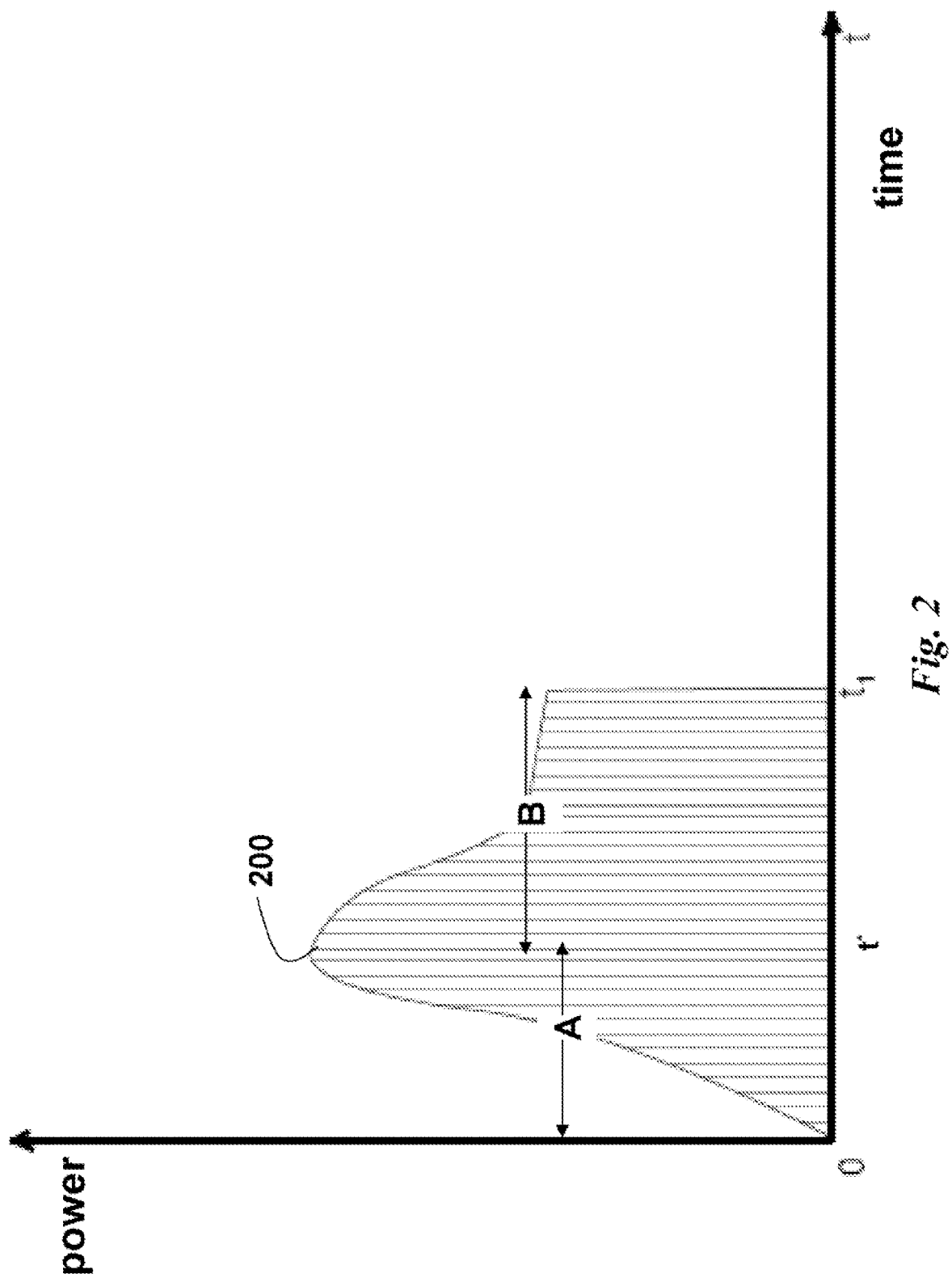
FIG. 2 is a power profile of one car for one possible segment of one path of the phase-space diagram of FIG. 1 according to an embodiment of the invention.

FIG. 2 shows the power profile 200 for a particular example possible segment. The vertical axis indicates power and the horizontal axis time. In this example, the power consumption rises quickly, as the car accelerates, and then stabilizes at a lower level, as the car reaches and maintains constant speed.

The phase-space diagram of FIG. 1 and the power profile 200 of a segment of FIG. 2 are related as follows. Consider the points A and B in the phase-space diagram of FIG. 1. Point A is the state of the car when it is stopped, i.e., the velocity ẋ is zero at the fourth floor. Point B is the state of the car when the car has accelerated, i.e., ẋ>0, and is halfway between floors 4 and 5. This is the last possible point along the path when the car can start decelerating if it wants to stop at floor 5. If the car does not: decelerate, the car can stop only at floors 6 and higher.

The line in the phase-space diagram between points A and B represents one segment of the trellis. This segment has a power profile that, is a function of the time taken while traversing the segment as shown in FIG. 2. We denote the time when the car starts traversing this segment by $t_A$, and the time the car ends traversing this segment as $t_B$. The power profile for this segment is defined by the power consumed by the car for any moment in time $t_A < t < t_B$. In FIG. 2, $t_A = 0$, and $t_B = t_1$.

Figure 3:
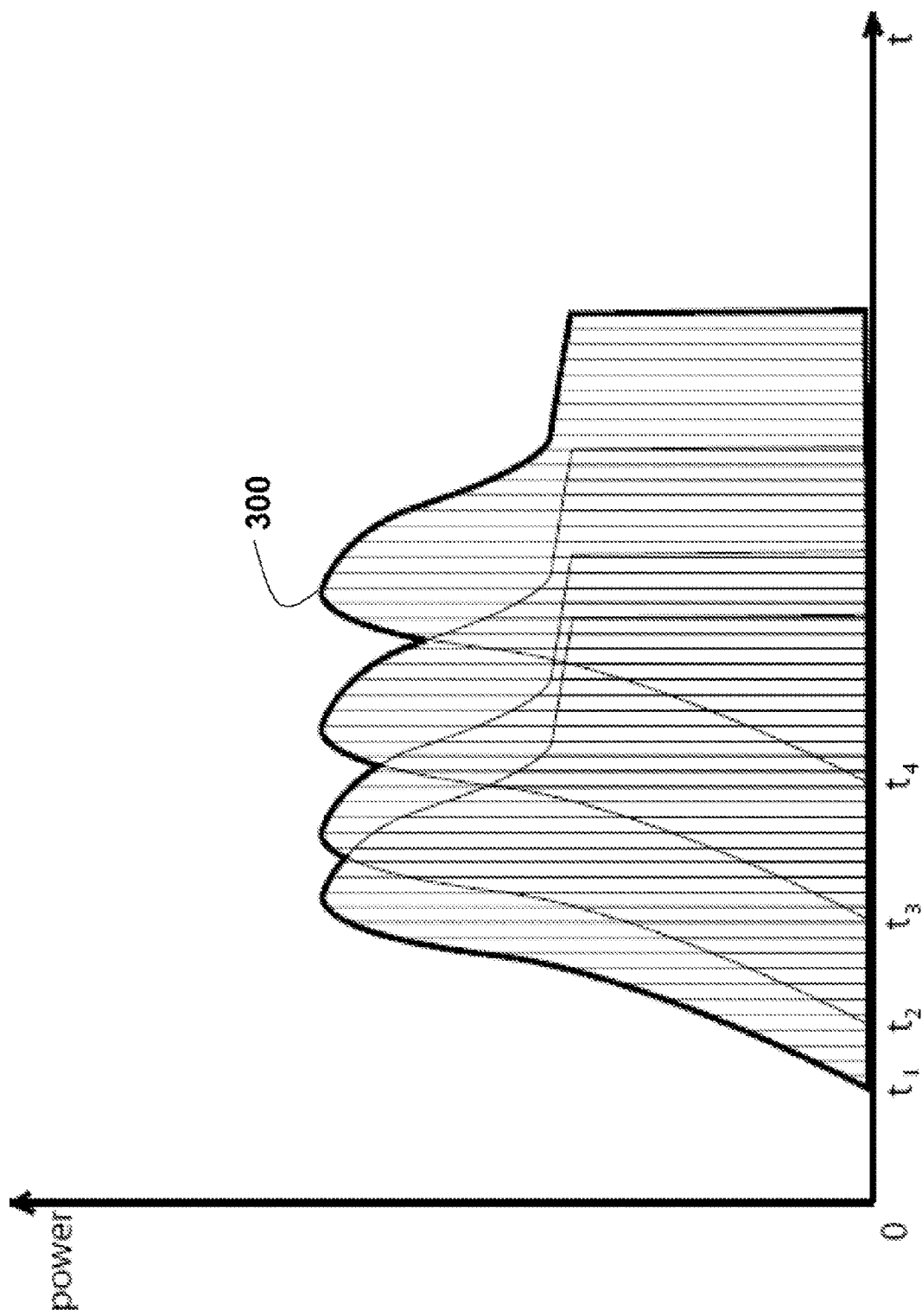
FIG. 3 is a power profile for four starting times for the same segment according to an embodiment of the invention.

FIG. 3 shows four possible starting times for this segment. FIG. 3 shows the case when the car can leave point A at four different times, i.e., $(t_1, \ldots, t_4)$, and the resulting: inner maximization over the respective power profiles 300

$$F_s(t) = \max_{\tau \in \gamma_s} f_s(t, \tau)$$

Here, the size of the set $\gamma_s$ is four. In practice, the size of the set can be very large, especially for the states near the end of the schedule. It can be seen that the displacement of the peak of the profile according to varying starting times causes multiple ripple-like peaks in the result. Multiple realizations of the same segment of the phase-space diagram are represented by the same power profile suitably displaced in time. Maximization of consumed power over all realizations results in multiple peaks.

Given our definition of a segment as shown in FIG. 2, it is also true that there is only one significant power peak per segment. Peak power consumption occurs when the elevator motor either accelerates or decelerates the car. There is only one such event per segment. There are also segments when the car simply maintains its rated speed. The corresponding power profile is a constant function of time, and can also be considered to have only a single, flat peak.

As shown in FIG. 2, the time of the peak power consumption is t*, relative to the start of the segment $t_0$. For notational convenience, we assume that $t_0 = 0$. We partition the power profile into two parts. The first part A starts at time $t_0$, and ends at time t*. The second part B starts at time t* and ends at the time of completion of the segment, $t_1$. Part A has duration t*, and part B has duration $t_1 - t^*$.

The maximal power consumed at time t* is $$P^*: P^* = f_s(t^*, 0),$$

where s is the index of the segment, and $f_s(t, t_0)$ is the power profile for that segment when realized at time $t_0$.

There are exponentially many possible realizations of a given segment, so the maximum power profile over all of them will have many peaks. If there are infinitely many such peaks distributed randomly in time, then there is a peak at every point in time between the earliest and the latest possible peaks. In other words, in the limit of infinitely many realizations, the part of the profile between the respective peaks of the earliest and latest realizations of this segment is a straight line 401 of constant power. This idea serves as the basis for our method.

Figure 4:
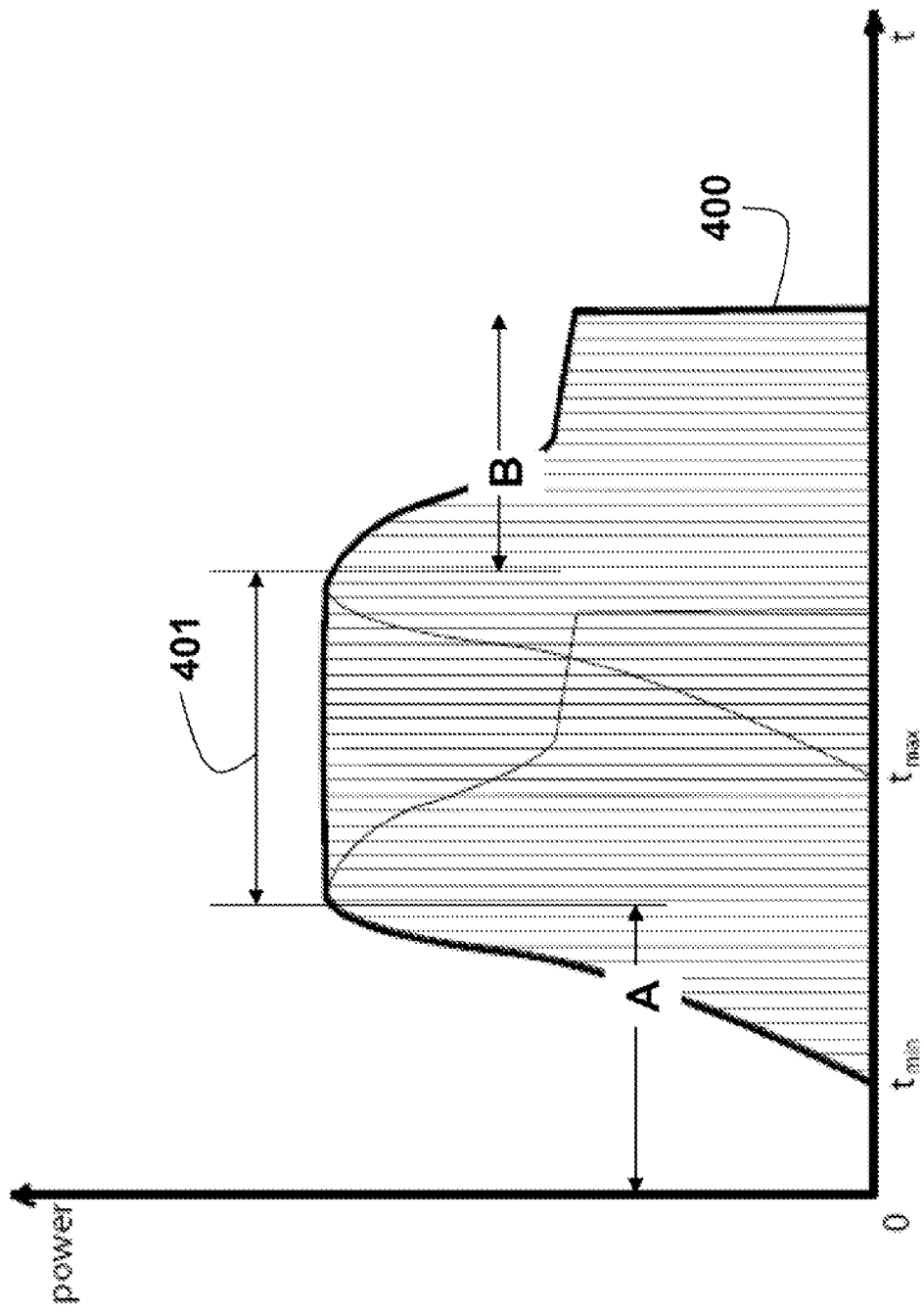
FIG. 4 is an approximated power profile of the car over all possible, infinitely many, starting times according to an embodiment of the invention.

As shown in FIG. 4, we approximate the power profile resulting from power maximization over all possible realizations of a given segment as a composition of three parts, as follows.

(1) The first part of the profile $F_s$ has the shape of part A, as described above for FIG. 2. It starts at time $t_{min}$, which is the earliest possible time when a traversal over this segment can be initiated. The duration of this part is the same as that of part A, i.e., t*. The end of this part is at time $t_{min} + t^*$. For this interval, $t \in [t_{min}, t^*)$, $F_s(t) = f_s(t, t_{min})$.

(2) The second part of the profile is the straight line 401. This is a constant function of time of magnitude P*, starting at time $t_{min} + t^*$, and ending at time $t_{max} + t^*$ where $t_{max}$ is the latest time when a traversal over this segment can be initiated. For this interval ($t \in [t_{min} + t^*, t_{max} + t^*]$) $F_s(t) = f_s(t_{min} + t^*, t_{min}) = f_s(t^*, 0) = P^*$.

(3) The third part of the profile has the shape of part B as described above. It starts at time $t_{max} + t^*$, and ends at time $t_{max} + t_1$. For this interval, ($t \in [t_{max} + t^*, t_{max} + t_1]$), $F_s(t) = f_s(t, t_{max})$.

FIG. 4 shows that the approximate profile $F_s(t)$ 400 of the segment s over all possible starting times is similar to that of the single realization $f_s(t, \tau)$ over this segment:, but: with an interval 401 of constant power of duration $t_{max} - t_{min}$ inserted at the position of the peak of power $f_s(t, \tau)$.

The remaining problem is how to find the earliest ($t_{min}$) and the latest ($t_{max}$) times when a traversal of segment s can occur. Considering all possible paths that can lead to the starting point of the segment is impractical. There are exponentially many such paths. Therefore, we modify our ESA-DP described in U.S. Pat. No. 6,672,431 as follows.

As shown in FIG. 5, our modified art ESA-DP method also uses a trellis structure 500, which includes states (black circles) 501 and transitions (arcs) 502 among these states. Each state corresponds to a branching point in the phase-space diagram of FIG. 1, and a specific number of passengers present in the car at that point.

For example, FIG. 5 shows a dynamic programming trellis for one particular elevator car, which corresponds to the situation when a car is moving down and is about to reach the branching point at which it will stop at floor 13, if it decelerates. The car has already been scheduled to pick up a passenger at floor 7, and the controller is considering whether this car should also serve a new down hall call originating at floor 11.

The trellis has 84 states, which are placed in a matrix of 7 rows and 12 columns. States in each row represent branching points that share the property that the car will stop at the same floor, when the car starts decelerating immediately. Note that this applies to branching points reached when the car is moving in a particular direction. If the car is moving in the opposite direction, the branching points generally have different positions in the phase-space diagram. The corresponding row of the trellis is labeled with the floor at which the car can stop, as well as the direction of the movement of the car when it reaches the branching points. Because there is a separate row for each floor and direction, the trellis can have at most 2N rows.

The states in each row of the trellis are organized into F groups, e.g. 4 in FIG. 5, corresponding to the V possible velocity values at branching points, ordered so that the leftmost column correspond to zero velocity, and the rightmost column correspond to the maximum velocity of the car. Within a group, the states correspond to the number of people who are in the car and who were waiting in the halls at the beginning of the trellis, ranging from 0 to 2 in FIG. 5. This organization of states constitutes the trellis of the system. It can be seen that not all of the states in the trellis can be serviced by the car, because its motion is constrained by the current hall and car calls.

Some of the states in the trellis are connected by transitions which describe the possible segments in the phase-space diagram, while loading and unloading passengers according to their boarding floors and desired destinations. Each transition in the trellis corresponds to a combination of a segment and a number of passengers in the car. In general, the power consumption during the traversal of the same segment changes according to the number of passengers in the car.

Each possible segment s has a power profile $f_s(t, \tau)$, as well as a fixed duration $t^{(s)}_1$. This segment can be initiated at many different starting times $\tau$. Given this description of the state space of the system and the allowed transitions, and the durations of the segments, the objective is to determine for each state of the trellis the earliest time, and respectively, the latest time when the state can be reached. These determine the earliest and latest times when the segments coming out of that state can be realized.

In essence, the trellis is an acyclic graph whose vertices are the states of the trellis, and whose edges are the transitions or segments of the trellis. The graph is acyclic because all transitions are either to the same row or to the row below the row of the starting state of this transition, if the transitions are to the same row, they are always to a state located to the left of the starting state.

If we number the states of the trellis in ascending order starting from the upper right corner of the trellis, and proceed row-by-row from top to bottom and column-by-column from right to left, we can define a full linear ordering of the states of the trellis. It can be seen that all transitions are from a state with a lower number to a state with a higher number, according to this linear ordering. That is, when a transition is realized, the system always transitions to a state with a higher number, eventually reaching the state with the largest possible number, without ever visiting the same state twice. However, some of the states of the trellis are not reachable.

If we think of the transition durations as edge lengths or segments in the graph, then the problem of finding the earliest time when a state q cart be visited becomes equivalent to finding the shortest trellis path in the graph between the starting state $q_0$ and the state q. The length of that trellis path, expressed as the sum of the individual lengths of all transitions along the trellis path, is precisely equal to the earliest time state q can be visited. Note, that, path through the trellis is distinguished from the path that the elevator car traverses.

A number of procedures for finding the shortest trellis path in an acyclic graph can be used for this purpose, for example the well known Dijkstra or Floyd-Warshall procedures. Those procedures are generally based on the following property:

$$t^q_{min} = \min_{r \in R} [t^r_{min} + \Delta t(r, q)],$$

where $t^q_{min}$ is the earliest time state q can be reached, R is the set of nodes from which state q can be reached, and $\Delta t(r, q)$ is the duration of the transition between states r and q.

In practice, procedures for finding the shortest trellis paths work by enforcing the equality above by assigning values to $t^q_{min}$ according to the latest estimates for the right-hand side, in a computational step known as a Bellman backup. In general, the computational complexity of such algorithms is O(n log n), where n is the number of vertexes in the graph.

However, the trellis of the elevator car movement has the additional property of a complete linear ordering of the states, as described above. This can be used to determine $t^q_{min}$ for all states q in time linear in n. To this end, the states are traversed in increased order, i.e., forward in time, according to the linear ordering, and Bellman back-ups are performed once per state. Because all transitions are from lower-numbered states to higher-numbered states, when performing a Bellman backup for state q, it is guaranteed that the values $t^r_{min}$ of all predecessor states r have already been determined by that time.

For an acyclic graph with full linear ordering, such as our elevator trellis, a very similar procedure can be used to find the longest trellis path in the graph between the starting state $q_0$ and a particular state q. Again, states are traversed in increasing order of their number, performing Bellman backups of the type;

$$t^q_{max} = \max_{r \in R} [t^r_{max} + \Delta t(r, q)],$$

where $t^q_{max}$ is the latest time state q can be reached. In practice, $t^q_{min}$ and $t^q_{max}$ can be determined concurrently during the same traversal of the trellis. After $t^q_{min}$ and $t^q_{max}$ are available for each state of the trellis q, the cumulative power profile $F_s(t)$ for each possible transition s in the trellis over all possible starting times can be approximated, as described above for FIG. 4, as including three parts.

The last step is to perform one more maximization, this time over all possible transitions $F(t) = \max_{s \in S} F_s(t)$. As already noted, the number of transitions or segments in the set S is not particularly large, e.g., at most linear in the number of floors N and at most quadratic in the number of waiting passengers M.

However, the maximization over continuous functions of time can be impractical. To this end, and without significant loss of accuracy, the final power profile F(t) is determined at a finite number of discrete points $t^{(i)} = i\Delta t$, i=0, I, such that $F^{(i)} = F(t^{(i)}) = F(i\Delta t)$ for a suitably selected time step $\Delta t$ that can be varied according to required accuracy. Then, $F^{(i)} = \max_{s \in S} F_s(\Delta t)$.

In practice, an array of running estimates $F^{(i)}$ can be maintained in memory and updated with the progress of Bellman backups over the trellis: for each new transition (segment) s, $F_s(i\Delta t)$ can be determined, and the corresponding value of $F^{(i)}$ can be updated, if it is discovered that traversal of that transition can potentially result in a peak power consumption for that moment in time.

The computation of $F_s(i\Delta t)$ can use either analytical models of the power profile $f_s(t, \tau)$, or empirically recorded power profiles from actual elevator operation, stored in a table in a memory of the controller.

FIG. 6 shows the details of tire method according to our invention. Similar to the ESA-DP method, the set of all possible elevator paths are decomposed into segments, and the set of all possible segments are organized in the trellis 500. However, the computational steps are different. The ESA-DP estimates average waiting times, working backwards in the trellis, while the present method determines the earliest and latest times when the elevator bank can enter a state of the trellis, working in the forward direction in the trellis.

The method controls the elevator cars 652 of the building 650 with multiple floors. The method receives input from the elevator controller 651. The input includes waiting passengers 601, direction of travel 602, car speeds 603, and constraints 622. These inputs define a current state of the system. Knowing the current state, possible states, i.e., possible paths of the car can be determined upon receipt of a new hall call 621.

The method determines 620, for each car, all possible paths and segments of the paths 623 to service a hall call 621, considering existing car positions, speed, and destinations, as well as constraints 622. Subsets of the possible paths form possible schedules for servicing passengers either waiting or already in cars. If the total peak power 641 consumption at any instant in time for a possible schedule is less than a threshold, the schedule 653 is selected 645, and the elevator controller (CTRL) 651 can operate the bank of elevator cars 650 accordingly.

For each car, the peak power for all possible segments 623 is estimated 630 according to the power profiles 300 for all possible future times.

The peak power for each time instant for the possible segments 623 for the car are added 640 to determine a total peak power 641 for each time instant. A particular schedule 653 is selected 645 if the total peak power consumption at any instant in time is less than a predetermined threshold 642.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining, for any instant in time, total peak power consumption for a bank of elevator cars, comprising;
    determining, for each car in response to receiving a hall call, a set of all possible paths to service all hall calls assigned to the ear, in which each path includes a set of all possible segments;
    determining a peak power consumption for each possible segment;
    adding the peak power consumptions for the set of all possible segments for each time instant to determine a total peak power consumption for each time instant; and
    selecting a particular path as a schedule to operate the bank of elevator cars, if the total peak power consumption for any instant in time while operating according to the selected schedule is below a predetermined threshold.

2. The method of claim 1 wherein the set of all possible paths of each car depend on a current state of the elevator system, and further comprising:
    defining the current state of the elevator system by passengers having assigned cars, and for each car a direction of travel, a position, and a velocity of the car.

3. The method of claim 1 further comprises:
    organizing the set: of all possible states in a corresponding dynamic programming trellis, and wherein transitions between the states correspond to the set of all possible path segments.

4. The method of claim 1 further comprising:
    associating each segment with a power profile.

5. The method of claim 1, in which the bank of elevator cars includes traction sheave elevators without counterweights.

6. The method of claim 1, in which a destination associated with the hall call is unknown.

7. The method of claim 1, in which the peak power consumed when following a particular path p is $f_p(t)$, and the total peak power is $F(t)=\max_{p \in P} f_p(t)$, where P is the set of all possible paths.

8. The method of claim 1, further comprising:
    modeling the set of all possible segments with a phase-space diagram.

9. The method of claim 8, in which the total peak power consumption. F(t) at a particular instant in time t is a nested maximization.
$$F(t)=\max_{s \in S}\max_{\tau \in \gamma_s} f_s(t, \tau),$$ where S is a set of all possible segments of the phase-space diagram, and $\gamma_s$ is the set of all possible starting times $\tau$ for realizations of a particular segment s.

10. The method of claim 9, in which the realization of the particular segment s depends on the starting time $\tau$ of the realization, and a profile of the total peak power consumption is time-invariant
$$f_s(t, \tau)=f_s(t+\Delta t, \tau+\Delta \tau),$$
for any time interval $\Delta t$, 11. The method of claim 10, in which the peak power profile $F_s(t)$ of the segment s is approximated by a first part: for $t \in [t_{min}, t^*)$, $F_s(t)=f_s(t, t_{min})$, a second part: for $t \in [t_{min}+t^*, t_{max}+t^*])$, $F_s(t)=f_s(t_{min}+t^*, t_{min})=f_s(t^*, 0)$, and a third part: for $t \in (t_{max}+t^*, t_{max}+t_1])$, $F_s(t)=f_s(t, t_{max})$, where $t^*$ is a time of peak power consumption, and $t_{min}$ is an earliest time and $t_{max}$ is a latest time when traversal of segment s can start, respectively.

12. The method of claim 11, in which the earliest time $t_{min}$ and the latest time $t_{max}$ when a traversal of segment s can start are determined by means of dynamic programming, using recurrent equalities $$t^q_{min}=\min_{r \in R}[t^r_{min}+\Delta t(r, q)], \text{ and}$$

$$t^q_{max}=\max_{r \in R}[t^r_{max}+\Delta t(r, q)], \text{ and}$$

where q is the state of the trellis at the beginning of segment s, and R is the set of states at the beginning of segments which end with state q, and $\Delta t(r, q)$ is a duration of the segment between state r and state q.

13. The method of claim 12, in which the determination of the earliest and the latest start times for each segment is performed in a single pass over the state of the trellis, starting from an upper right end of the trellis and proceeding row-by-row towards a bottom row of the trellis, while proceeding right to left within each consecutive row.

14. The method of claim 13, in which the earliest: time $t_{min}$ and the latest time $t_{max}$, as well as maximization of the peak power for any moment in time between the earliest time $t_{min}$ and the latest time $t_{max}$ is updated during the same pass over the trellis, such that F(t) is assigned a value of $F_s(t)$, if the previous estimate of F(t) is lower than $F_s(t)$.

15. The method of claim 14, in which the update is performed for a discrete set of time moments $t^{(i)}=i\Delta t$, i=0, I, for a selected time step $\Delta t$, such that $F^{(i)}=F(t^{(i)})=F(i\Delta t)$, and $F^{(i)}$ is assigned a value of $F_s(i\Delta t)$s if a previous estimate of $F^{(i)}$ is lower than $F_s(i\Delta t)$.

16. The method of claim 15, where all peak power profiles $F^{(i)}$ for each car are added up separately for each time instance $t^{(i)}$, and the schedule is accepted only if the sums of the total peak power for all time instances $t^{(i)}$ is below a predetermined threshold, 17. The method of claim 1, in which the bank of elevator cars includes traction sheave cars with counterweights.

18. A system determines, for any instant in time, total peak power consumption for a bank, of elevator cars, comprising:
    means for determining, for each car in response to receiving a hall, call, a set of all possible paths to service all hall calls assigned to the car, in which each path includes a set of all possible segments;
    means for determining a peak power consumption for each possible segment;
    means for adding the peak power consumptions for the set of all possible segments for each time instant to determine a total peak power consumption for each time instant; and
    means for selecting a particular path as a schedule to operate the bank of elevator cars, if the total peak power consumption for any instant in time while operating according to the selected schedule is below a predetermined threshold.

19. The system of claim 18 wherein, the set of all possible paths of each car depend on a current state of the elevator system, and further comprising:
    means for defining the current state of the elevator system by passengers having assigned cars, and for each car a direction of travel, a position, and a velocity of the car.

* * * * *